Oct. 20, 1931. A. JOSEPH 1,828,146
APPARATUS FOR THE TREATMENT OF GAS OR A MIXTURE OF GAS
AND VAPOR IN THE PRESENCE OF CATALYTIC AGENTS
AND FOR THE REACTIVATION OF SUCH AGENTS
Filed Dec. 22, 1928  2 Sheets-Sheet 1
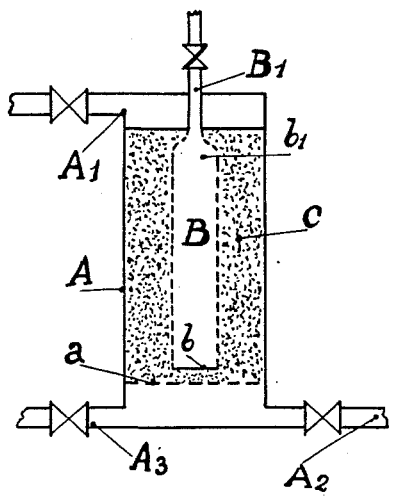
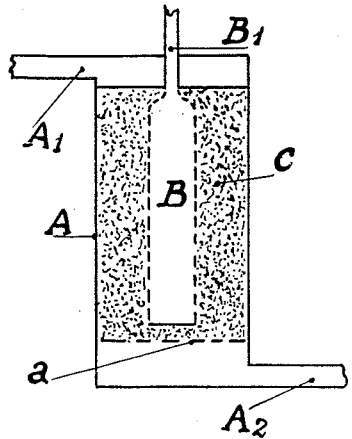
INVENTOR.
Alfred Joseph.
BY Cameron, Kerkam and Sutton.
Attorneys.

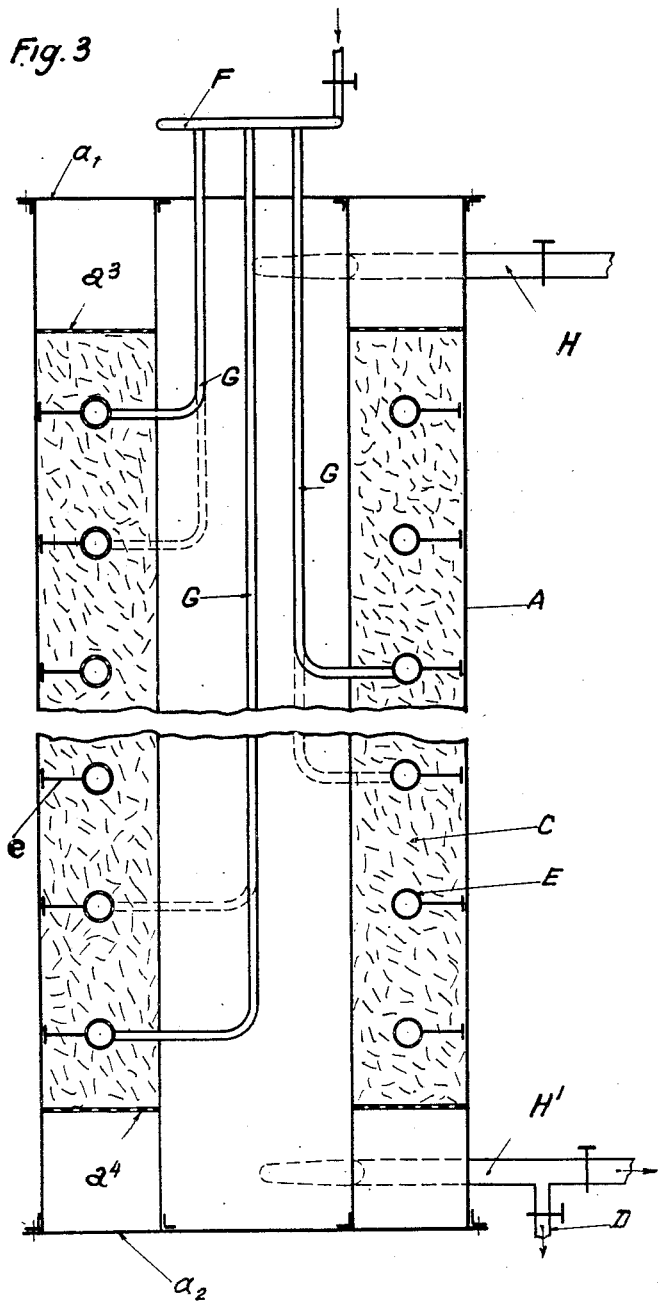

Patented Oct. 20, 1931

1,828,146

UNITED STATES PATENT OFFICE

ALFRED JOSEPH, OF ENGHIEN, FRANCE, ASSIGNOR TO COMPAGNIE INTERNATIONALE POUR LA FABRICATION DES ESSENCES ET PETROLES, OF PARIS, FRANCE, A LIMITED JOINT-STOCK COMPANY OF FRANCE

APPARATUS FOR THE TREATMENT OF GAS OR A MIXTURE OF GAS AND VAPOR IN THE PRESENCE OF CATALYTIC AGENTS AND FOR THE REACTIVATION OF SUCH AGENTS

Application filed December 22, 1928, Serial No. 328,011, and in France August 20, 1928.

This invention relates to a process and apparatus for the treatment of gas or a mixture of gas and vapor in the presence of catalytic agents and for the reactivation of such agents.

Catalytic agents, in the presence of which reactions are effected, for example with a view to chemical syntheses, are employed in practice often in the form of small solid bodies of inert material carrying the catalyzing substance fixed either by deposition on the surface or by more or less intimate mixture.

Now, in the action of a gas injected into a vessel containing such catalysts, whether it be in the process of catalysis itself or in the regeneration of the catalysts effected by a reducing gas or by an oxidizing gas, the chemical action occurs first at the inlet of the gas into the apparatus then propagates itself from place to place, in such manner that at every instant the reaction is essentially concentrated at one point of the catalyzing mass, which involves the following disadvantages:—

When the reaction in question is exothermic, as it frequently is, the heat of reaction, concentrated at every moment in a small volume, brings an undesirable increase of temperature which has to be combatted by appropriate measures.

In the case of regeneration of the catalysts, the reaction occurs only from place to place, the action of the gas comes into play only on a small volume at any given instant, which involves a regeneration period longer than appears logical. Such regeneration period can, obviously, be reduced by increasing the volume of the gases injected per second and by means of injection of the gases in parallel into the various parts of a plant, but this can be effected only under certain limits.

In the case of the catalysis itself, the continuous reactivation of the catalysts, by injection of a given gas, proceeds in the above indicated fashion, in such manner that at any given instant merely a small volume of the catalysts are particularly active. In consequence, the products to be catalyzed circulating during this period, are in contact only during a relatively short time with catalysts in a suitable state of activity, instead of being during the whole of their passage over the total volume of the catalysts employed.

According to the invention, the reaction chambers containing the catalyzing agents and the inlets for the gases and vapors to be treated in the presence of such agents are arranged in such manner that all the elements of the catalytic mass are practically simultaneously effective. This result can be obtained for example by the mutual envelopment of the reaction chambers and the distribution pipes for the gas or vapor or gaseous regeneration agents, such pipes being suitably perforated along their surface in a manner to distribute along all thereof the points of inlet of said gaseous agent. In this fashion, the reaction in question, be it catalysis or regeneration, takes place throughout all the mass simultaneously, in such manner that at any given instant the reaction in question takes place in the same manner and under the same conditions at each point of the mass of catalysts.

The accompanying drawings illustrate, by way of example, apparatus suitable for carrying out the invention, in these drawings:—

Fig. 1 is a diagrammatic vertical section of one apparatus, and

Fig. 2 is a similar view of a modified apparatus.

Fig 3 is a diagrammatic vertical section, on a larger scale, of another modified apparatus.

In the arrangement illustrated in Fig. 1, the vessel containing the catalysts is a drum A and the operation in question is assumed to be merely the blowing of air or a mixture of air and steam for the regeneration of the catalysts. Along the axis of A is located a cylinder B perforated throughout its longitudinal wall and which, closed at one end $b$, is connected at the opposite end $b^1$ to an inlet pipe $B^1$ for a regenerative agent such as air or oxygen for example or a mixture of air and steam. The catalyst C is arranged on a perforated base $a$, pipes $A^1$, $A^2$, $A^3$ furnished with cocks are provided respectively for the inlet of gaseous products to be catalyzed, the outlet of the products of the reaction and the outlet of the regenerating agent.

It has been found that the duration of the regeneration can be reduced in the proportion of 20 to 1, relatively to that of injecting air solely at the top and causing it to traverse the whole drum, and moreover the temperature attained during regeneration is limited to a far lower level than in usual methods.

The same processes and apparatus can likewise be employed for facilitating the catalytic reactions. In the diagram of Fig. 2, the tubular vessel A contains the catalysts C and the reaction in question may be the action on hydrocarbon vapors of nascent hydrogen produced by the decomposition, by means of a metal oxide, of the sulphuretted hydrogen contained in an injected gas. The perforated tube B located within the drum A serves for the evacuation or emission of the sulphuretted hydrogen by the pipe $B^1$. By $A^1$ the hydrocarbons are admitted in the state of vapor, and the pipe $A^2$ serves for the outlet of the hydrocarbons and residual gases.

It is obvious that the employment of the same processes may be arranged concurrently for the purposes of facilitating the catalytic reactions on the one hand and the regeneration of the catalytic agents on the other hand.

For this purpose, the catalytic agents may be disposed in a perforated annular cage, the gases to be treated being admitted by the enveloped wall or by the enveloping wall during the reaction, whereas the gaseous regeneration agent is admitted by the enveloping or enveloped wall, during the reactivation period.

It is not indispensible to employ a tubular cylindrical form for the vessels and conduits. Also the perforations for the admission of the gaseous agents may be replaced by small metallic nozzles.

A special method of carrying out the process described above and an apparatus therefor is illustrated diagrammatically by Fig. 3 of the annexed drawings in longitudinal sectional elevation through the axis of the apparatus, applied, by way of example, to a purifying apparatus, and comprising in consequence a distributing system for the regenerating agent for the purifying masses.

In this Fig. 3, A denotes an annular chamber closed by a cover and base $a^1$ and $a^2$. The catalytic agent, of the catalytic mass type, metallic or otherwise, is located in this chamber, at C, between two perforated partitions $a^3$ and $a^4$. In the annular space comprised between the partition $a^3$ and the imperforate cover $a^1$ opens the pipe H for the inlet of the gases or mixtures to be purified. In the annular space between $a^4$ and $a^2$ opens the pipe $H^1$ for the outlet of the purified gases. From the pipe $H^1$ may be branched an outlet pipe D for the gaseous regenerating agent charged with the impurities fixed on the purifying mass.

In accordance with the invention, the gaseous regenerating agent is distributed simultaneously throughout the entire height of the annular column A, through a series of perforated annular nozzles E, distributed at suitable intervals, which may be supported by brackets e fixed to the wall of the chamber A, or in any other appropriate manner. These nozzles are fed with regenerating gas, this being supplied by a trunk pipe F, from which branches a series of pipes G connected respectively to the several nozzles E.

This form of construction offers the advantage of supplying the regenerating agent directly into the heart of the purifying gas to be regenerated, and of distributing it uniformly in all directions from the inlet zone located at equal distances from the walls of the annular vessel A. Thus the fullest profit is taken of the advantage mentioned above, according to which the regenerating air or oxygen being rapidly and uniformly distributed within the mass to be regenerated, the duration of the regeneration is considerably decreased, whilst the temperature attained during the regeneration is maintained as low as necessary, without employing additional means.

Claims:

1. Apparatus of the class described comprising a substantially annular reaction chamber having a catalytic mass therein, a plurality of annular nozzles embedded in and distributed uniformly throughout said mass, supply pipes leading to each of said nozzles, and a common trunk to which said supply pipes are connected.

2. In combination with a reaction chamber having a catalytic mass therein of the type adapted to catalyze gases and to be regenerated by other gases producing an exothermic reaction therewith, means for supplying the gas to be catalyzed to said chamber, means for exhausting the reaction products from said chamber, and a plurality of gas delivering means distributed throughout said chamber for delivering regenerating gas thereto at a plurality of spaced points between said supply and exhaust means so as to distribute said regenerating gas simultaneously and uniformly throughout said mass, whereby excessive heating is prevented, said gas delivering means being independent of said gas supply means and having a separate supply trunk for supplying regenerating gas thereto.

3. In combination with a reaction chamber having a catalytic mass therein of the type adapted to catalyze gases and to be regenerated by other gases producing an exothermic reaction therewith, means for supplying the gas to be catalyzed to said chamber, means for exhausting the reaction products from said chamber, and a plurality of nozzles embedded in said mass at spaced points between said supply and exhaust means for distributing regenerating gas simultaneously and uniformly therethrough, whereby the reaction period is shortened and excessive heating is avoided, said nozzles being independent of said gas supply means and being connected to a separate supply trunk from which the generating gas is delivered thereto.

4. Apparatus of the class described comprising a cylindrical reaction chamber having a catalyst therein, means for supplying material to be catalyzed at one end of said chamber, means for exhausting the reaction products from the other end of said chamber, and additional means independent of said supply means for delivering a regenerating agent at a plurality of longitudinally spaced points within said chamber whereby all elements of the catalytic mass are regenerated substantially simultaneously.

In testimony whereof I have signed this specification.

ALFRED JOSEPH.